Jan. 10, 1956  C. W. BALLMAN  2,729,990
JACK FOR MACHINE TOOLS
Filed Jan. 29, 1953
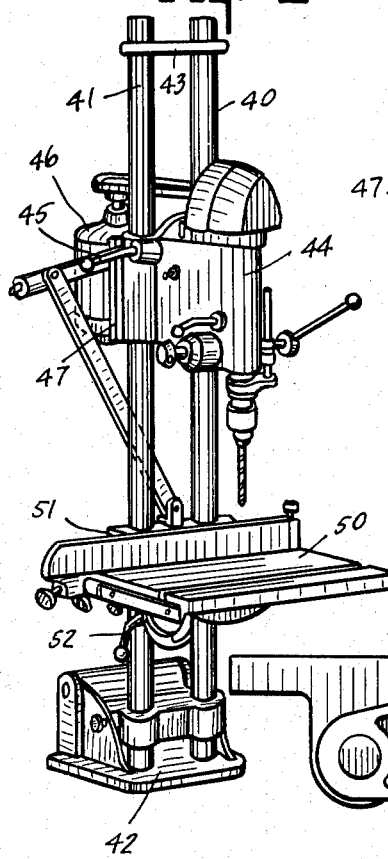
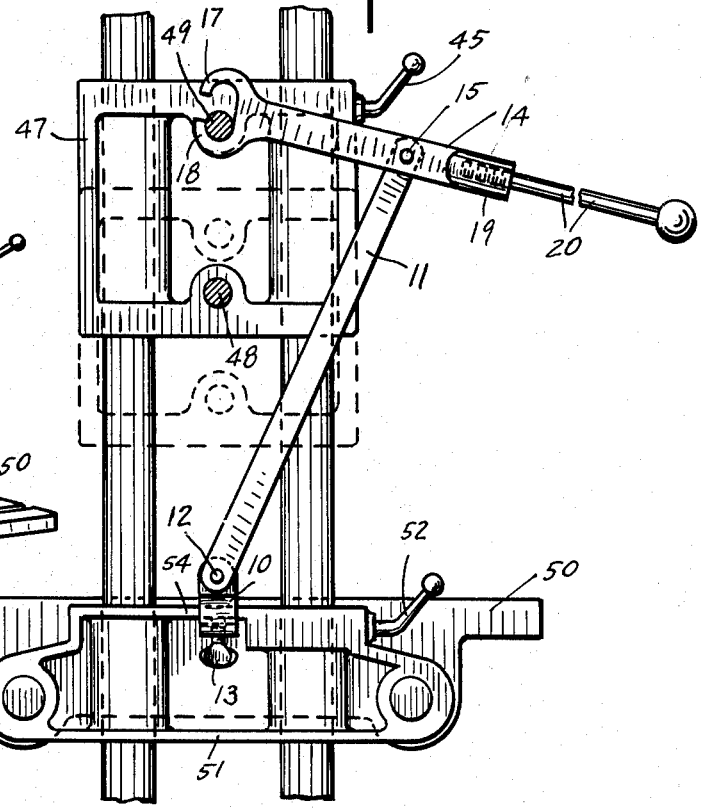
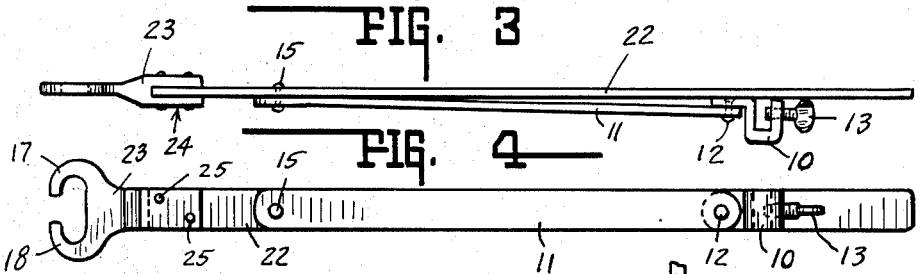
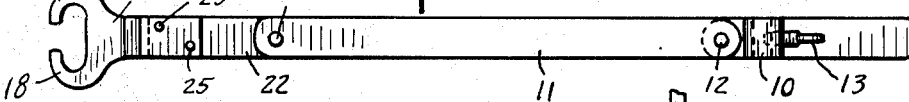
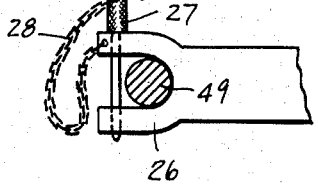
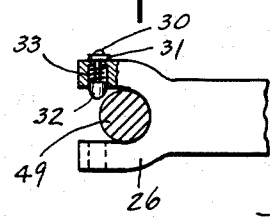
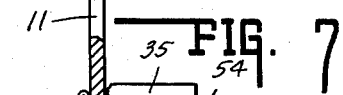
INVENTOR.
CHARLES W. BALLMAN.
BY
Lockwood, Galt, Woodard & Smith
ATTORNEYS.

United States Patent Office 2,729,990
Patented Jan. 10, 1956

2,729,990

JACK FOR MACHINE TOOLS

Charles W. Ballman, Indianapolis, Ind.

Application January 29, 1953, Serial No. 334,062

1 Claim. (Cl. 77—5)

This invention relates generally to jacks for machine tools and more particularly to a jack for lifting the head of a drill press or lowering the work table of a drill press.

In certain machine tools such as drill presses it is frequently necessary to vertically adjust the position of a drill press head on the supporting column. Similarly it is frequently necessary to adjust the work table with respect to the head. A drill press head frequently includes as a part thereof the driving motor, and hence it is heavy and consequently awkward to adjust with respect to the work table. This is particularly true if the supporting column is coated with an accumulation of dirt or other debris. Accordingly, it is desirable to provide as an accessory for a drill press, or any other machine tool the adjustment of which is difficult, a jack by means of which the head or table of the particular machine may be easily adjusted with relation to one another.

The principal object of this invention is to provide a jack adapted to be attached to one portion of a drill press or other machine tool for adjusting another portion relatively thereto.

Still another object of this invention is to provide a jack as an accessory for a drill press or other machine tool including a clamping means which may be attached to the work table of the drill press and a hook-like lever which may cooperate with a suitable portion of the head of the drill press whereby the relative positions of the table and head may be adjusted with minimum effort on the part of the operator.

In accordance with this invention there is provided as an accessory for drill presses or similar machine tools a lifting jack comprising a clamp and a lever mechanism having a hook portion whereby the clamp may be attached to the table of a drill press, and the hook may be attached to a portion of the head of a drill press for adjusting the relative positions of the table and head.

The full nature of the invention will be understood from the accompanying drawings and the following description and claim:

Fig. 1 is a perspective illustrating the application of this invention to a drill press.

Fig. 2 is a front elevation showing the lifting jack provided by this invention

Fig. 3 is a top plan view showing the lifting jack of this invention with the lever mechanism in folded position.

Fig. 4 is a front view of the jack illustrated in Fig. 3.

Fig. 5 is a detail illustrating a modification of the hook portion of the lever mechanism illustrated in Figs. 2, 3 and 4.

Fig. 6 is a detailed view illustrating another modification of the hook portion of the lever mechanism illustrated in Figs. 2, 3 and 4.

Fig. 7 is a detail view partially in cross section illustrating a modified clamp which is adapted to be attached to the lever mechanism illustrated in Figs. 2, 3 and 4.

Referring to Figs. 1 to 4 this invention comprises a lifting jack having a U-shaped clamp 10 pivotally mounted to the free end of a standard 11 by means of a pivot pin 12 which may be a bolt or rivet fixedly mounted in the lower end of standard 11 as illustrated in Figs. 2 and 3. Pin 12 should be arranged in such a way that standard 11 may pivot with respect to the clamp 10. Thumbscrew 13 is threaded to clamp 10 whereby the clamp may be fastened to a suitable part of machine tool as will be described.

The upper end of standard 11 may be pinned or otherwise pivotally attached to a lever 14 by means of a pivot pin 15 having the form of a rivet or bolt such that lever 14 may pivot with respect to standard 11.

Lever 14 is flat and relatively thin and includes at its outer end a double hook consisting of opposed hook portions or spaced bights 17 and 18. At the other end of lever 14 there is provided an internally threaded socket 19 for receiving the handle 20, the length of which is such as to provide leverage enough to permit a lifting action without the exertion of excessive energy.

Figs. 3 and 4 illustrate a modification of this invention wherein the lever 14 is replaced by a longer lever 22 which is long enough so that no auxiliary handle is required. Instead of having an integrally formed hook portion, as shown in Fig. 2, this modification of the invention includes a head 23 which may be a casting having a double hook 17 and 18 and a yoke 24 which receives the end of lever 22, and which accommodates at least two rivets 25 for fastening head 23 to lever 22.

Fig. 5 illustrates a modification of the double hooks 17 and 18 illustrated in Figs. 2, 3 and 4. There is provided a yoke 26 having a pin member 27 which may rest in suitable bores in the outer extremities of each arm of the yoke. Pin 27 may be chained to yoke 26 by means of a chain 28. The function of pin 27 will become apparent in subsequent description.

Fig. 6 illustrates a modification of the yoke illustrated in Fig. 5 wherein a catch is substituted for pin 27. The catch may be mounted in the upper arm of the yoke and consists of a headed shaft 30 slidably mounted in a plate 31 attached to the outer surface of yoke 26. The inner end of shaft 30 may be enlarged into a head portion 32, and a spring 33 is provided for permitting head 32 to recede within the arm of yoke 26 when the yoke is operated according to this invention.

Fig. 7 illustrates a modified clamp having a U-shaped body portion 35 through the base of which is secured pivot pin 36 for mounting in the end of the standard 11 in place of the rivet 12. The clamp includes a thumbscrew 37 threaded within the arm 38, whereby the clamp may be operatively engaged with the work table or other part of a machine tool, as will be described subsequently.

For purposes of illustrating the application of this invention to a machine tool, Fig. 1 shows a machine tool which is now commercially available, and which comprises a double column standard having two upright tubular members 40 and 41. These members rest in a base 42 and are spaced from one another at the top by means of a suitable spacer 43. A drill press head 44 is mounted for sliding movement on the members 40 and 41 and may be clamped thereto by means of a clamp screw 45. This structure is conventional and is not described in detail. For adjustably mounting the motor 46 on the head 44 there is provided a base 47 to which the motor may be attached, and this member cooperates with a pair of spaced mounting bars 48 and 49. These bars may be an integral part of base 47, and they are slidably attached to an interior portion of the head 44 thereby to provide an adjustable mounting for base 47. The machine tool also includes a work table 50 which comprises a cast portion 51 which is bored to be slidably mounted on the members 40 and 41. A clamping set screw 52 is provided for locking the table 50 in any desired vertical position on members 40 and 41.

In normal operation of the machine tool it frequently becomes necessary to adjust the vertical position of head 44 with respect to table 50, and in order to lift head 44 by means of this invention clamp 10 may be mounted over the edge 54 of table 50, and the thumbscrew 13 may be tightened to securely fix clamp 10. The hook portion 17, 18 of lever 14 being flat and relatively thin may then be inserted between base 47 and head 44 and detachably and transversely engaged with the motor mounting bar 49 in the position illustrated in Fig. 2. It should be noted that the spacing between the outer ends of hook portions or bights 17 and 18 is such as to permit selective engagement of either of the bights with the mounting bar. With the lifting jack in the position illustrated in Fig. 2, downward pressure on handle 20 will lift the head 44 to any desired position after which it may be clamped by means of the clamping set screw 45.

If instead of adjusting head 44, it is desired to adjust table 50, the lifting jack may be placed in the same position as that illustrated in Fig. 2 except that the upper hook portion 17 may be engaged with motor mounting bar 49, and table clamp screw 52 may be released. If table 50 slides freely on members 40 and 41, then it is merely necessary to exert upward pressure on handle 20 sufficient to prevent table 50 from falling. On the other hand, if the members 40 and 41 are coated with foreign substances and, consequently, there is appreciable friction, downward pressure on handle 20 will position table 50 to the desired position relative to head 44.

The modifications illustrated in Figs. 3 and 4 operate in the same manner as described in connection with that shown in Fig. 2. The modification illustrated in Fig. 5 operates in a generally similar manner to the hooks 17 and 18 except that pin 27 may be inserted through the apertures in yoke 26 after the yoke has been engaged with motor mounting bar 49. Pin 27 serves to hold yoke 26 in engagement with bar 49 while an adjusting operation is completed. The modification illustrated in Fig. 6 also serves to replace hook portions 17 and 18 in that the catch 32 serves to hold yoke 26 in positive engagement with motor mounting bar 49.

From the foregoing description it will be apparent that this invention is particularly adapted to adjust heavy parts of machine tools relatively to one another and thereby eliminates the need for expenditure of excessive energy in making such adjustments. The jack is adapted not only to lift one portion of a machine tool with respect to another, but it is also adapted to lower one portion of a machine tool with respect to another whereby it serves a double function. The jack is adapted to cooperate with many different types of drill presses or with any other machine tool where one portion must be adjusted vertically with respect to another.

The invention claimed is:

An attachable and detachable accessory lifting or lowering jack for machine tools having parts vertically adjustable to fixed positions relative to one another and including a transverse mounting bar, comprising a U-shaped clamp for attachment to one part of said machine tool, a standard pivotally mounted on said clamp, and a lever pivotally connected at the other end of said standard and having a double hook including spaced bights at one end for detachably and transversely engaging the mounting bar of the other part of said machine tool whereby either of said bights may selectively engage said bar for lifting or lowering either of said parts with respect to the other part.

References Cited in the file of this patent

UNITED STATES PATENTS 2,140,854     Schnebly _____ Dec. 20, 1938